R. WOOD.
LUBRICATOR.
APPLICATION FILED AUG. 15, 1914.
1,135,644.
Patented Apr. 13, 1915.
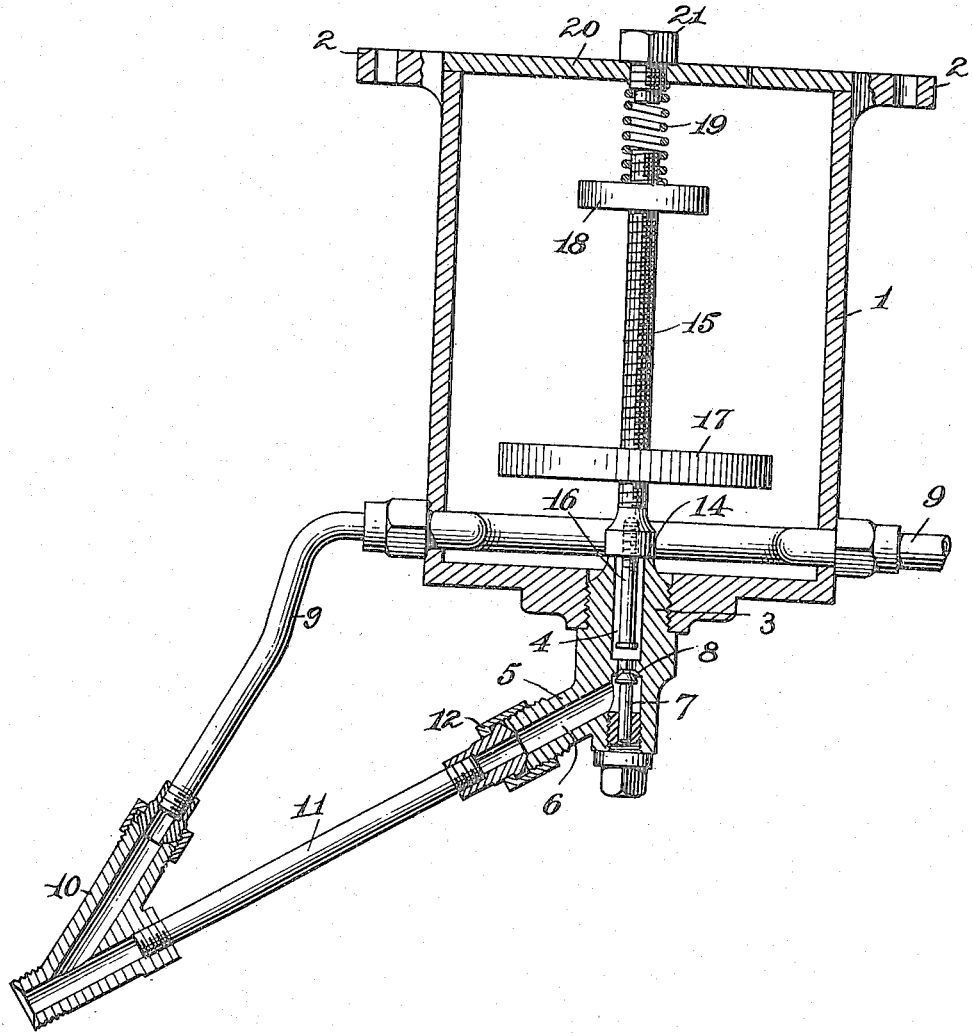
Attest:
Alda L. Miller
Mary L. Lewis
Robert Wood, Inventor:
by William R. Baird
his Atty

UNITED STATES PATENT OFFICE.

ROBERT WOOD, OF BROOKLYN, NEW YORK, ASSIGNOR TO THE NATHAN MANUFACTURING COMPANY, OF NEW YORK, N. Y., A CORPORATION OF NEW YORK.

LUBRICATOR.

1,135,644.  Specification of Letters Patent.  Patented Apr. 13, 1915.

Application filed August 15, 1914. Serial No. 856,923.

*To all whom it may concern:*

Be it known that I, ROBERT WOOD, a subject of the King of Great Britain and Ireland, residing at 435 East Fourth street, Brooklyn, in the county of Kings and State of New York, have invented certain new and useful Improvements in Lubricators, of which the following is a specification.

This invention relates to lubricating devices, and more especially to what are known as flange oilers, such as are carried by locomotive engines.

One of the objects of the invention is to provide a lubricating device including a reservoir and a valve controlling the flow of lubricant from the reservoir, which valve is controlled by the vibrations of the locomotive engine or other support upon which the lubricator is secured.

Another object is to provide a lubricator whose feed is controlled by the vibration of its support, together with means for insuring normal feed of the lubricant despite cold weather conditions.

Still another object of the invention is to provide a lubricator whose feed is controlled by the vibration of its support, and to embody the same in a very simple and mechanically practical structure.

In the accompanying drawing, I have shown the invention embodied in a flange oiler which is intended for attachment in some appropriate position upon a locomotive engine; but it is to be understood that the drawing is to be taken as merely illustrative of the invention, the scope of the application of which is indicated by the claims.

In the drawings, the figure is a vertical sectional view, with parts in elevation, of a flange oiler, including my invention.

Referring to the numerals on the drawing, there is shown at 1 a suitable reservoir or container, which may be supported in position upon a locomotive engine or the like by means of the attaching lugs 2. In the bottom of this container, there is a screw-threaded plug 3, which has a passage 4 extending centrally therethrough and an offset portion 5 provided with a bore 6 that communicates with the said central passage 4. Communication between the central passage 4 of the plug and the passage 6 is controlled by means of a check-valve 7, which coöperates with a valve seat 8 formed by a reduced part of the plug at the lower end of the passage 4. This check-valve 7 permits of the flow of fluid from the central bore 4 of the plug into the offset passage 6, but the check-valve is moved into position to close communication between the passages 4 and 6 in case a fluid under pressure moves through the bore 6 toward the central passage 4. A steam pipe 9 preferably passes through the reservoir 1 in order to keep the contents thereof in a liquid condition, and the said pipe 9 communicates with a union 10, which union is also connected to the offset portion 5 by means of a pipe 11 and union 12. The purpose of this steam pipe arrangement is to keep the oil from clogging and incidentally, by reason of a sort of injective action, to assist in bringing the oil to the desired point of discharge.

The flow of oil from the reservoir into the passage 4 is controlled by a valve responsive to the vibration of the locomotive engine or other support. In the present instance, the plug 3 has a plane surface on its upper end surrounding the passage 4, and the plane end 14 of a rod 15 rests upon the end of the plug. I prefer also to provide a short rod 16 of comparatively small diameter which is threaded into the end of the rod 15 and extends down into the passage 4, the purpose of this rod 16 being to prevent too great a departure from the vertical, of the rod 15.

I also provide a weight in the shape of a disk 17, which is screw-threaded upon the rod 15 so that it may be vertically adjustable upon the latter. There is also a second disk 18, screw-threaded upon the rod 15 near the upper end of the rod, and a coil spring 19 surrounds the end of the rod 15 and bears between the disk 18 and the cover 20 of the reservoir. This coil spring 19 may be fastened at the end of an adjusting screw 21, extending through the cover 20, so that the tension of the spring can be adjusted.

In operation, so long as there is no vibration of the locomotive or other support, the end 14 of the rod 15 will remain seated on the plug 3, even though the locomotive be standing in a position which would tend to throw the rod 15 out of the vertical, as, for instance, when the locomotive is standing on a curve, where one side of the track is higher than the other. This is because the rod 15 tends to return to the vertical by gravity, after every departure therefrom, when the apparatus is in normal position; and when the abnormal position of the apparatus would tend to throw the rod out of the vertical, this is prevented by reason of the action of the spring 19. The movement of the rod 15 is a sort of wabble, responding to the vibration of the locomotive or support. The sensitiveness of the valve control is regulated by the adjustment of the disk 17, whose vertical position of course determines the location of the center of gravity; the higher the center of gravity, the more sensitive the valve.

The device may be used with or without the steam pipe, and with or without the check valve 7, but I prefer to employ these additional elements because they render the device more efficient and certain in its action regardless of weather conditions.

I claim:

1. In a device of the kind described, a reservoir subject to vibration, a steam pipe extending therethrough, an outlet for the reservoir, a wabbling valve controlling the outlet, and a connection between the outlet and the steam pipe.

2. In a device of the kind described, a reservoir subject to vibration, an outlet for the reservoir, a discharge pipe connected to the outlet, a wabbling valve controlling the outlet, a steam pipe arranged around the outlet, and a connection between the discharge pipe and the steam pipe.

3. In a device of the kind described, a reservoir subject to vibration, a steam pipe extending therethrough, an outlet for the reservoir, a valve controlling the outlet, a connection between the outlet and the steam pipe, and a check valve arranged beneath the valve for preventing the backward movement of the fluid to the reservoir.

4. In a device of the kind described, a reservoir subject to vibration, a steam pipe extending therethrough, an outlet for the reservoir, a wabbling valve controlling the outlet, said valve including a threaded rod, a weight arranged for adjustment thereon, an adjustable disk on the rod arranged above the weight, a spring on the end of the rod, means for tensioning the spring, and a connection between the outlet and the steam pipe.

In testimony whereof I affix my signature in presence of two witnesses.

ROBERT WOOD.

Witnesses:
MARY H. LEWIS,
ALDA L. MILLER.

Copies of this patent may be obtained for five cents each, by addressing the "Commissioner of Patents, Washington, D. C."